Patented Dec. 12, 1933

1,939,033

UNITED STATES PATENT OFFICE

1,939,033

RECOVERY OF SULPHUR

Raymond F. Bacon, Bronxville, and Isaac Bencowitz, New York, N. Y.; said Bencowitz assignor to said Bacon No Drawing. Application August 2, 1930
Serial No. 472,695

13 Claims. (Cl. 23—224)

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores.

The process of the present invention involves the roasting of ore or other metallurgical raw materials or products containing pyrites or other sulphides of iron, alone or in combination with sulphides of other heavy metals under such conditions that elemental sulphur is produced.

The present invention is based on our discovery that a reaction between sulphur dioxide and ferrous sulphide or pyrites is promoted when conducted in the presence of one or more metal salts containing oxygen. Our invention contemplates the utilization of this discovery in carrying out a roasting operation to cause the sulphur dioxide produced by the reaction of the oxygen of air with pyrites or other sulphides of iron to react with additional quantities of pyrites or other sulphides of iron to produce elemental sulphur and iron oxide.

When ferrous sulphide or pyrites or a mixture of these two compounds alone or in combination with other heavy metal sulphides is subjected to the action of sulphur dioxide at elevated temperatures, the sulphur dioxide and ferrous sulphide or pyrites react to produce ferric oxide and elemental sulphur in accordance with the following equations:

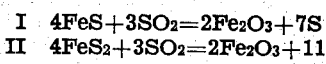

The foregoing reactions normally occur very slowly. We have found that the reactions may be materially accelerated when conducted in the presence of certain metal salts containing oxygen. Among the metal salts which we have used successfully under suitable conditions are alkaline earth metal compounds such as magnesium oxide, magnesium sulphite, magnesium sulphate, magnesium carbonate, calcium oxide and calcium sulphite; and heavy metal oxides such as ferric oxide and aluminum oxide. The aforementioned compounds may be used alone or they may be used as mixtures in which the various components are present in any desired proportions. We have found that magnesium oxide and mixtures of compounds including magnesium oxide may be used to particular advantage.

In conducting the reactions it is desirable that intimate mixtures of the iron sulphide-bearing materials and the metal compounds containing oxygen be provided. For this reason, it is advisable to use materials in finely divided forms, preferably in which the particles are at least sufficiently small to pass a 40-mesh screen. Sulphide-bearing material consisting of particles sufficiently small to pass a 150 mesh screen may be used advantageously. If desired the mass of material to be exposed to the action of the sulphur dioxide may be moistened with water to form small lumps or aggregates to insure intimate contacts.

A complete process of the invention involves mixing of finely divided iron sulphide-bearing material with one or more oxygen containing compounds, passage of air or other oxygen-bearing gas in contact with the mixture under such conditions that sulphur dioxide is produced by reaction of the oxygen with a portion of the iron sulphide-bearing material and caused to react with additional iron sulphide-bearing material, and recovery of the liberated sulphur. The roasting may be conducted either with pure oxygen or with a gas having a substantial concentration thereof or it may be conducted with air, for the sulphur producing reactions proceed satisfactorily when either dilute or concentrated sulphur dioxide-bearing gases are employed. It is only necessary to so control the operations that sufficient iron sulphide-bearing material to react with the oxygen and sulphur dioxide is provided and to insure the existence of a substantially oxygen-free atmosphere in a portion of the reaction chamber. The heat of reaction is sufficient to provide suitable temperatures but additional heating means may be provided to permit accurate temperature control.

In treating mixtures containing different compounds different temperature conditions are required. In general temperatures as high as 800° C. may be used to produce satisfactory results. When magnesium compounds are used alone or in conjunction with other compounds temperatures between 600° C. and 800° C. may be employed.

The residue remaining after the separation of the sulphur may be treated by a water or air separating process to recover the oxygen containing compound for reuse and to provide an iron oxide product for any suitable further treatment desired.

The process may be conducted in any suitable type of roasting apparatus but we prefer to use a rotary kiln structure in which the solid materials may be sufficiently stirred to insure thorough contact with the gaseous reagents.

The invention will be better understood from a consideration of the following description of a process involving the roasting of a mixture of pyrites and magnesium oxide.

An intimate mixture of pyrites and magnesium oxide is introduced in a finely divided condition, or, in the form of small lumps or agglomerates, into the interior of a rotary reaction chamber having ore charging means at one end and discharging means at the other end, and which is so constructed and operated that the ore is gradually moved from the charging end toward the discharge end. A passage for removing vaporized sulphur and inert gases is provided adjacent the charging end of the kiln. Heating means may be provided within or exteriorly of the chamber to permit accurate temperature control. Air is introduced into the reaction chamber at the end opposite to that at which the mixture of pyrites and magnesium oxide is introduced and the air and the mixture of pyrites and magnesium oxide pass through the chamber in countercurrent relationship.

The pyrites and magnesium oxide are ground to provide particles sufficiently small to pass a 40-mesh screen and preferably sufficiently small to pass a 100-mesh screen in order that intimate contact of the oxygen of the air, sulphur dioxide and the magnesium oxide with the pyrites may be obtained.

The process is preferably so controlled that a temperature of about 600° C. to 650° C. is maintained in the reaction chamber.

The temperature within the kiln is sufficiently high to effect distillation of at least a portion of the pyrites with the resulting liberation of elemental sulphur and the production of ferrous sulphide.

The process is preferably so regulated that the pyrites is substantially all converted to ferrous sulphide when it reaches the central portion of the kiln during the course of its passage from the charging end toward the discharge end. The oxygen of the air entering the discharge end portion of the kiln reacts with the ferrous sulphide contained therein to produce sulphur dioxide and ferric oxide. The sulphur dioxide produced passes through the kiln toward the gas exit in the charging end. In passing toward the gas exit, the sulphur dioxide comes into intimate contact with the pyrites and ferrous sulphide contained in the charging end portion of the kiln and is reduced, elemental sulphur and ferric oxide being produced.

The admission of air and pyrites should be so controlled that all of the oxygen of the air is consumed and all of the sulphur dioxide produced is reduced, providing a substantially oxygen-free atmosphere within the charging end portion of the kiln and permitting the removal of substantially sulphur dioxide free gases from the kiln.

The process is preferably carried out continuously. The elemental sulphur is produced in vapor form and a continuous stream of sulphur-laden gases is conducted from the reaction chamber to a suitable condenser in which the sulphur is recovered. The process may be so controlled that the magnesium oxide remains substantially unaffected. The magnesium oxide may be changed physically and a portion may be converted to the sulphate form. The magnesium oxide remains with the ferric oxide produced which is discharged continuously from the kiln.

The feeding and discharging operations are preferably so conducted that the entrance of air through the charging and discharging passages is prevented. A separate passage for the admission of air is provided to permit accurate control. Air at normal atmospheric temperatures or in a preheated condition may be employed as desired.

The hot residue containing the ferric oxide and magnesium oxide is preferably subjected to an air separating operation to recover the magnesium oxide which may be used in the treatment of additional pyrites. It is unnecessary to make a clean separation of the ferric oxide from the magnesium oxide as the presence of ferric oxide in the magnesium oxide used for promoting the reaction is beneficial or, at least, not harmful.

The process may be modified to permit the introduction of the magnesium oxide with the air. In such a modified process the pyrites alone might be admitted at the charging end and the magnesium oxide blown in with the air at the discharge end.

If desired, ferrous sulphide and/or pyrites may be admitted to the interior of the kiln at a point between the charging and discharge ends. This type of feeding might be used to supplement the feeding of a mixture of magnesium oxide and pyrites or ferrous sulphide at the charging end, and it may be accomplished by providing a feed pipe of suitable length at the central axis of the kiln. Ferrous sulphide admitted to the interior of the kiln at about the center thereof would be oxidized by air to sulphur dioxide and ferric oxide with the result that considerable heat would be developed and the resulting hot sulphur dioxide would act upon the ferrous sulphide-magnesium oxide-mixture as it enters the central region of the kiln.

Suitable means may be included in the system for collecting dust carried by the gases leaving the kiln.

We claim:

1. The method of recovering elemental sulphur which comprises roasting with a limited amount of oxygen-containing gas a charge of iron sulphide containing one or more alkaline earth metal compounds at a temperature sufficiently high to promote a reaction between iron sulphide and free oxygen, but not high enough to fuse the charge.

2. The method of recovering elemental sulphur which comprises roasting with a limited amount of oxygen-containing gas a charge of iron sulphide containing one or more alkaline earth metal compounds containing oxygen at a temperature sufficiently high to promote a reaction between iron sulphide and free oxygen, but not high enough to fuse the charge.

3. The method of recovering elemental sulphur which comprises roasting with a limited amount of oxygen-containing gas a charge of iron sulphide in the presence of one or more magnesium compounds.

4. The method of recovering elemental sulphur which comprises roasting with a limited amount of oxygen-containing gas a charge of iron sulphide in the presence of one or more magnesium compounds containing oxygen.

5. The method of recovering elemental sulphur which comprises subjecting a charge comprising iron sulphide and a compound of an element of the group consisting of calcium and magnesium to the action of a gas containing free oxygen at an elevated temperature below the fusing point of the charge, the amount of free oxygen employed being not substantially in excess of that required to form iron oxide with the iron contained in the charge.

6. The method of recovering elemental sulphur which comprises subjecting a charge comprising iron sulphide and a compound of an element of the group consisting of calcium and magnesium to the action of a gas containing free oxygen at a temperature of about 600 to 800° C., the amount of free oxygen employed being not substantially in excess of that required to form iron oxide with the iron contained in the charge.

7. The method of recovering elemental sulphur which comprises subjecting a charge comprising iron sulphide and a magnesium compound to the action of a gas containing free oxygen at an elevated temperature below the fusing point of the charge, the amount of free oxygen employed being not substantially in excess of that required to form iron oxide with the iron contained in the charge.

8. The method of recovering elemental sulphur which comprises subjecting a charge comprising iron sulphide and a magnesium compound to the action of a gas containing free oxygen at a temperature of about 600 to 800° C., the amount of free oxygen employed being not substantially in excess of that required to form iron oxide with the iron contained in the charge.

9. The method of recovering elemental sulphur which comprises subjecting a charge comprising iron sulphide and magnesium oxide to the action of a gas containing free oxygen at an elevated temperature below the fusing point of the charge, the amount of free oxygen employed being not substantially in excess of that required to form iron oxide with the iron contained in the charge.

10. The method of recovering elemental sulphur which comprises subjecting a charge comprising iron sulphide and magnesium oxide to the action of a gas containing free oxygen at a temperature of about 600 to 800° C., the amount of free oxygen employed being not substantially in excess of that required to form iron oxide with the iron contained in the charge.

11. The method of recovering elemental sulphur which comprises heating a charge comprising iron pyrites and a compound of an element of the group consisting of calcium and magnesium to a temperature sufficiently high to drive off a portion of the sulphur of the pyrites but not high enough to fuse the charge, and subjecting the resulting iron sulphide-bearing product to the action of a gas containing free oxygen at an elevated temperature below its fusing point, the amount of free oxygen employed being not substantially in excess of that required to form iron oxide with the iron contained in the iron sulphide-bearing product.

12. The method of recovering elemental sulphur which comprises heating a charge comprising iron pyrites and a magnesium compound to a temperature sufficiently high to drive off a portion of the sulphur of the pyrites but not high enough to fuse the charge, and subjecting the resulting iron sulphide-bearing product to the action of a gas containing free oxygen at an elevated temperature below its fusing point, the amount of free oxygen employed being not substantially in excess of that required to form iron oxide with the iron contained in the iron sulphide-bearing product.

13. The method of recovering elemental sulphur which comprises heating a charge comprising iron pyrites and magnesium oxide to a temperature sufficiently high to drive off a portion of the sulphur of the pyrites but not high enough to fuse the charge, and subjecting the resulting iron sulphide-bearing product to the action of a gas containing free oxygen at an elevated temperature below its fusing point, the amount of free oxygen employed being not substantially in excess of that required to form iron oxide with the iron contained in the iron sulphide-bearing product.

RAYMOND F. BACON.
ISAAC BENCOWITZ.